(12) United States Patent
Pisupati et al.

(10) Patent No.: US 10,979,254 B2
(45) Date of Patent: *Apr. 13, 2021

(54) SYSTEMS AND METHODS FOR FOCUSED BLIND DECONVOLUTION

(71) Applicant: Massachusetts Institute of Technology, Cambridge, MA (US)

(72) Inventors: Pawan Bharadwaj Pisupati, Melrose, MA (US); Laurent Demanet, Cambridge, MA (US); Aime Fournier, Boulder, CO (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,089

(22) Filed: Mar. 12, 2020

(65) Prior Publication Data

US 2020/0213164 A1    Jul. 2, 2020

Related U.S. Application Data

(63) Continuation of application No. 16/407,884, filed on May 9, 2019, now Pat. No. 10,616,008.

(Continued)

(51) Int. Cl.
*H03D 1/00* (2006.01)
*H04L 27/06* (2006.01)
(Continued)

(52) U.S. Cl.
CPC .......... *H04L 25/0305* (2013.01); *E21B 47/14* (2013.01); *H04L 25/03089* (2013.01)

(58) Field of Classification Search
CPC ........... H04L 25/0305; H04L 25/03089; H04L 25/0212; E21B 27/14; E21B 47/14;
(Continued)

(56) References Cited

U.S. PATENT DOCUMENTS 4,598,593 A    7/1986    Sheen et al.
5,130,951 A    7/1992    Kingman
(Continued)

FOREIGN PATENT DOCUMENTS

EP    1 249 208 A1    10/2002
EP    0 525 124 A1    3/2003
(Continued)

OTHER PUBLICATIONS

U.S. Appl. No. 16/361,073, filed Mar. 21, 2019, Demanet et al.
(Continued)

*Primary Examiner* — Phuong Phu
(74) *Attorney, Agent, or Firm* — Wolf, Greenfield & Sacks, P.C.

(57) ABSTRACT

Systems and methods for performing focused blind deconvolution of signals received by a plurality of sensors are disclosed. In some embodiments, this may include determining a cross-correlation of first and second signals, obtaining a cross-correlation of a first response function and a second response function based on the cross-correlation of the first and second signals and subject to a first constraint that the first and second response functions are maximally white, and obtaining the first and second response functions based on the cross-correlation of the first and second response functions and subject to a second constraint that the first and second response functions are maximally front-loaded.

13 Claims, 5 Drawing Sheets

Related U.S. Application Data

(60) Provisional application No. 62/669,082, filed on May 9, 2018.

(51) Int. Cl.
*H04L 25/03* (2006.01)
*E21B 47/14* (2006.01)

(58) Field of Classification Search
CPC ......... E21B 44/00; E21B 47/08; G01V 1/303; G01V 1/366; G01H 3/00; A61B 5/7257
USPC ........................................ 375/343, 346, 349
See application file for complete search history.

(56) References Cited

U.S. PATENT DOCUMENTS

| | | | |
|---|---|---|---|
| 5,151,882 A | 9/1992 | Kingman | |
| 5,173,879 A | 12/1992 | Cung et al. | |
| 5,400,299 A * | 3/1995 | Trantham | G01V 1/37 |
| | | | 181/108 |
| 5,416,750 A | 5/1995 | Doyen et al. | |
| 5,511,038 A * | 4/1996 | Angeleri | G01V 1/42 |
| | | | 367/40 |
| 5,994,690 A | 11/1999 | Kulkarni et al. | |
| 7,911,879 B2 * | 3/2011 | Jogi | G01V 11/002 |
| | | | 367/82 |
| 8,544,564 B2 * | 10/2013 | Moore | E21B 47/13 |
| | | | 175/50 |
| 10,616,008 B2 * | 4/2020 | Pisupati | E21B 47/14 |
| 2002/0120401 A1 | 8/2002 | Macdonald et al. | |
| 2004/0124009 A1 | 7/2004 | Hoteit et al. | |
| 2007/0285274 A1 | 12/2007 | Esmersoy | |
| 2007/0294036 A1 | 12/2007 | Strack et al. | |
| 2008/0025521 A1 | 1/2008 | Morise et al. | |
| 2008/0281523 A1 | 11/2008 | Dahl et al. | |
| 2009/0006058 A1 | 1/2009 | King | |
| 2012/0068712 A1 | 3/2012 | Taherian et al. | |
| 2013/0116926 A1 | 5/2013 | Rodney et al. | |
| 2013/0215717 A1 | 8/2013 | Hofland et al. | |
| 2014/0104980 A1 | 4/2014 | Sava et al. | |
| 2014/0121971 A1 | 5/2014 | Hanak et al. | |
| 2016/0245779 A1 * | 8/2016 | Khalaj Amineh | G01N 27/82 |
| 2016/0334270 A1 | 11/2016 | Van Manen et al. | |
| 2017/0307772 A1 | 10/2017 | Jutila et al. | |
| 2018/0171772 A1 | 6/2018 | Rodney | |
| 2019/0078430 A1 | 3/2019 | Fouda et al. | |
| 2019/0293832 A1 | 9/2019 | Grobbe et al. | |
| 2019/0349223 A1 | 11/2019 | Pisupati et al. | |

FOREIGN PATENT DOCUMENTS

| | | |
|---|---|---|
| WO | WO 90/03616 A1 | 4/1990 |
| WO | WO 2006/045340 A1 | 5/2006 |
| WO | WO 2017/160162 A1 | 9/2017 |

OTHER PUBLICATIONS

U.S. Appl. No. 16/407,884, filed May 9, 2019, Pisupati et al.
U.S. Appl. No. 16/594,482, filed Oct. 7, 2019, Fournier et al.
PCT/US2019/031481, Jul. 29, 2019, International Search Report and Written Opinion.
International Search Report and Written Opinion for International Application No. PCT/US2019/023456 dated Jun. 5, 2019.
International Search Report and Written Opinion for International Application No. PCT/US2019/054945 dated Dec. 30, 2019.
International Search Report and Written Opinion for International Application No. PCT/US2019/031481 dated Jul. 29, 2019.

* cited by examiner

SYSTEMS AND METHODS FOR FOCUSED BLIND DECONVOLUTION

CROSS-REFERENCE TO RELATED APPLICATIONS

This application is continuation of U.S. application Ser. No. 16/407,884, filed May 9, 2019, which claims the benefit under 35 U.S.C. § 119(e) of U.S. Provisional Application Ser. No. 62/669,082, filed on May 9, 2018, the contents of each of which are incorporated herein by reference in their entirety for all purposes.

FIELD

Disclosed embodiments are related to systems and methods for processing of measured signals to determine response functions.

BACKGROUND

A wide variety of drilling operations are performed in diverse types of media. For example, conventional drilling operations include oil and gas operations, $CO_2$ sequestration and injection operations, geothermal operations, and various fresh water operations. Often, prior to commencing, and in some applications, during a drilling operation, a survey of the medium is conducted to assess the properties of the medium. Such surveying operations are typically done with surface-based measurements of the medium where seismic measurements are made using seismic sources and sensors positioned on the surface above the medium.

SUMMARY

In one embodiment, a system comprises a first sensor configured to detect a first signal, a second sensor spaced from the first sensor and configured to detect a second signal, and a controller operatively coupled to the first and second sensors. The controller includes one or more processors configured to determine a cross-correlation of the first and second signals, obtain a cross-correlation of a first response function and a second response function based on the cross-correlation of the first and second signals and subject to a first constraint that the first and second response functions are maximally white, and obtain the first and second response functions based on the cross-correlation of the first and second response functions and subject to a second constraint that the first and second response functions are maximally front-loaded.

In another embodiment, a method comprises determining a cross-correlation of each pair of signals of a plurality of signals, obtaining a cross-correlation of response functions corresponding to each pair of signals based on the cross-correlations of the pairs of signals and subject to a first constraint that the response functions are maximally white, and obtaining the response functions based on the cross-correlations of the response functions and subject to a second constraint that the response functions are maximally front-loaded.

In a further embodiment, at least one non-transitory computer-readable storage medium stores processor executable instructions that, when executed by at least one hardware processor, cause the at least one hardware processor to perform a method. The method comprises determining a cross-correlation of a first signal and a second signal, obtaining a cross-correlation of a first response function and a second response function based on the cross-correlation of the first and second signals and subject to a first constraint that the first and second response functions are maximally white, and obtaining the first and second response functions based on the cross-correlation of the first and second response functions and subject to a second constraint that the first and second response functions are maximally front-loaded.

In yet another embodiment, a drilling system comprises a tool configured to be positioned on a drill string, a first sensor positioned along the drill string and configured to detect a first signal, and a second sensor positioned along the drill string and spaced from the first sensor. The second sensor is configured to detect a second signal. The drilling system further comprises a controller comprising at least one hardware processor and at least one non-transitory computer-readable storage medium storing processor executable instructions that, when executed by at least one hardware processor, cause the at least one hardware processor to perform a method. The method comprises determining a cross-correlation of a first signal and a second signal obtaining a cross-correlation of a first response function and a second response function based on the cross-correlation of the first and second signals and subject to a first constraint that the first and second response functions are maximally white, obtaining the first and second response functions based on the cross-correlation of the first and second response functions and subject to a second constraint that the first and second response functions are maximally front-loaded, and controlling the tool based on the first and second response functions.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
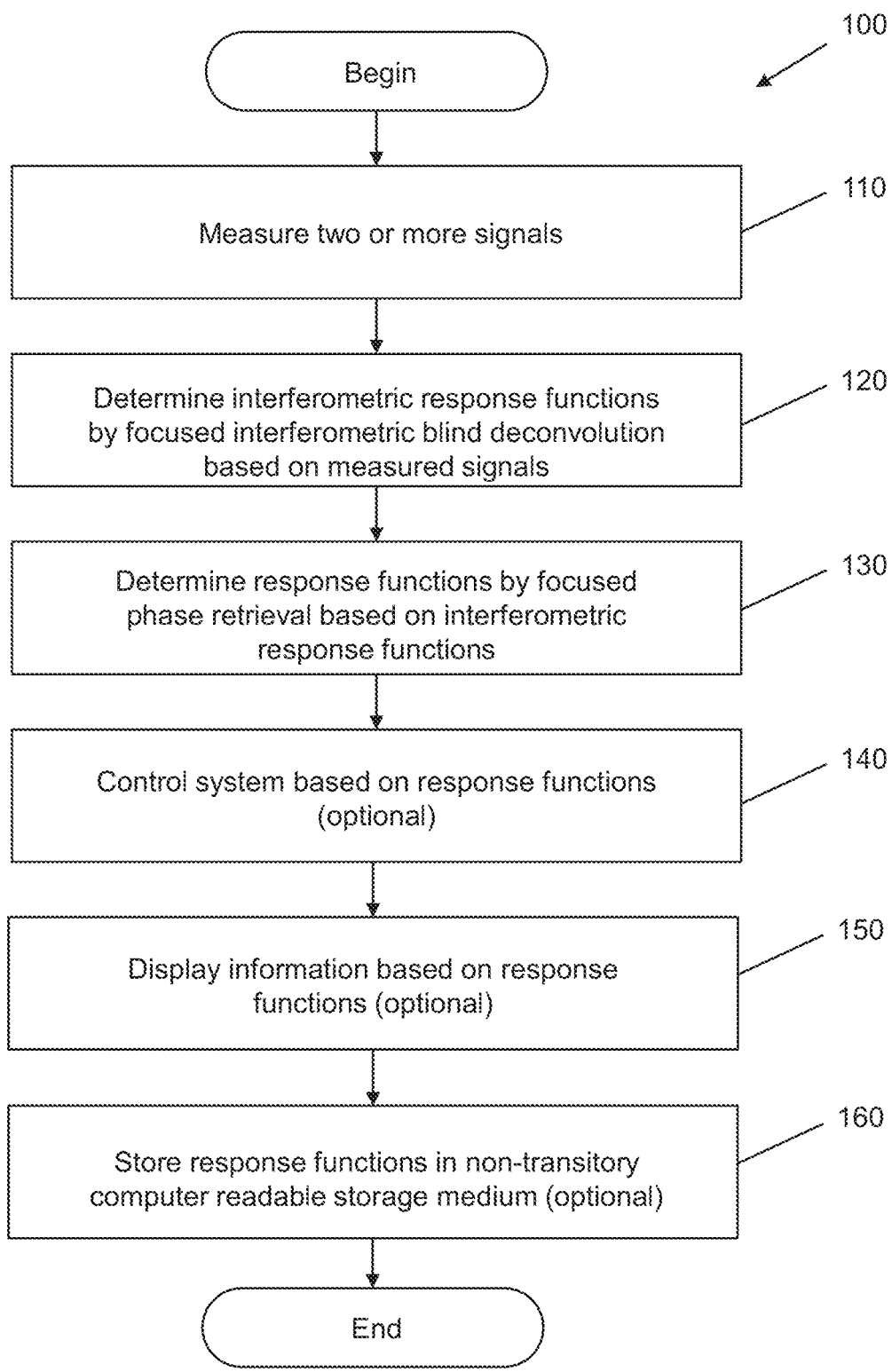
FIG. 1 is a flow chart depicting a focused blind deconvolution process, according to some embodiments.

The inventors have recognized and appreciated numerous challenges associated with measuring signals that originate from noisy sources. For example, in drilling applications, it may be desirable to measure a signal originating from a borehole drill. However, when measuring such signals with sensors such as seismic receivers placed within the borehole, within adjacent boreholes, and/or at the surface, the signal is affected by the properties of the medium (e.g., the earth) that the signal propagates through before reaching the sensors. Thus, instead of measuring the source signal, each sensor measures a signal that is a convolution of the source signal (which may be unknown or may have some inherent uncertainty) and a response function of the medium (e.g., an impulse response or subsurface Green's function). In some instances, such response functions may be different for each sensor. For example, the response function for a particular sensor may depend on a location of the sensor, an orientation of the sensor, and/or the specific characteristics of the medium through with the source signal propagates between the source and the sensor. Consequently, accurate characterization of the properties of the medium may involve deconvolution of the recorded signals to determine the response functions of the medium.

Similarly, in room acoustic applications, source signals such as speech signals or other audio signals may be recorded at a microphone array, and the recorded signals at each microphone may depend on a response function of the environment (e.g. a room) in which the audio signals propagate between the source (e.g. one or more speakers associated with the microphone array) and the microphone array. In some instances, the response function of the environment may distort the source signal, for example, due to one or more reflections off of walls, furniture, and/or other objects in the environment. As a result, accurate and/or simpler speech recognition and/or audio compression may benefit from the recorded audio signals being deconvolved to recover the original source audio signal.

Moreover, other applications such as digital image and/or video processing may involve data sets (e.g., pixels in an image) that are subject to a common source of noise. For instance, vibrations of a camera (e.g., due to shaking of a user's hand while recording a picture or video) which may lead to noise in the recorded pixels. In such applications, it may be desirable to deconvolve the noise signal from the underlying data set, for example, to recover a smoother video recording and/or more accurate or less noisy image. In one such embodiment, the images, and/or the corresponding pixels, may be grouped into subsets of the image or pixels that may be considered to be separate sensors that have received a response signal (i.e. the captured image). These signals may then be processed according to the methods disclosed herein to remove blur and/or shaking of an image due to these undesirable interferences.

In view of the above, the inventors have appreciated numerous benefits associated with techniques that can deconvolve a source signal (including a noisy source signal) from a response function that affects the signal (e.g., as the signal propagates through a medium to a position of a sensor that detects the signal). In some instances, such deconvolutions may be characterized as so-called "blind deconvolutions" where the response functions (e.g., impulse responses) are unknown. However, the inventors have also appreciated that existing blind deconvolution techniques may suffer from significant non-uniqueness issues. In particular, when using existing techniques, many possible estimated response functions may be determined, which, when convolved with a corresponding source signal, may result in the recorded signal. Consequently, existing techniques may not be able to accurately recover the actual response functions of a system, and/or the true source signal.

According to some aspects, the systems and methods described herein may perform a blind deconvolution process on a plurality of signals (e.g., recorded signals) while using focusing constraints. Accordingly, the systems and methods described herein may perform focused blind deconvolution to recover response functions of a systems based on recorded signals resulting from a source signal. As described in more detail below, the focusing constraints may be selected to address at least some of, and in some instances, all of the above-described non-uniqueness associated with existing blind deconvolution methods such that more accurate estimates of the system response functions may be obtained. Moreover, the focused blind deconvolution techniques described herein may allow for recovery of the system response functions without requiring prior assumptions regarding the statistics of the source signal and/or the underlying physics of the system. In some instances, once the response functions are determined, the source signal may be obtained based on the recorded signals and the response functions.

In some embodiments, a first focusing constraint may aid in seeking solutions to a blind deconvolution problem such that the response functions are considered maximally white. As used herein, a function that is maximally white may refer to a function having a substantially uniform amplitude spectrum, such that each frequency component of the function has a substantially equal amplitude, regardless of its phase. For example, a focusing constraint that seeks maximally white solutions may prefer functions having a flatter amplitude spectrum (i.e. a more uniform amplitude spectrum) over functions that have less flat amplitude spectra (i.e. exhibit a larger variation in amplitude spectrum across different frequencies).

In addition to the above, in some embodiments, an additional second focusing constraint may be used to aid in seeking solutions to the blind deconvolution problem such that the response functions are considered maximally front-loaded in the time domain. As used herein, a function that is maximally front-loaded may refer to a time dependent function having a strongest pulse, i.e. a pulse with a maximum amplitude, occurring earlier in time (e.g., near zero time). For example, a focusing constraint that seeks maximally front-loaded functions may prefer a response function (e.g., an impulse response) having a stronger pulse near zero time relative to other functions that have stronger pulses occurring at larger times. Physically, this may correspond to a pulsed signal that exhibits a largest amplitude when first emitted and that diminishes in amplitude with increasing time.

Depending on the particular embodiment, the response functions determined from a focused blind deconvolution process may provide various types of information related to the properties of a system including, for example, the physical characteristics of a medium through which the signal propagates. As noted above, in some instances, the response functions may be impulse response functions. For example, as described in more detail below, in seismic applications, such impulse response functions may correspond to subsurface Green's functions, which may be used to determine various characteristics of a medium such as acoustic and/or elastic properties (e.g., compressional and/or shear wave speeds, and/or anisotropy), attenuation properties, and other physical aspects of the medium. In other applications, such as room acoustic applications, the response functions may be impulse responses related to reflections, reverberations, interferences, absorptions, or other processes that may affect the acoustic response of a room or other environment. In other applications, such as digital imaging applications, the response functions may relate pixel values in an image to a source of noise in the image. While certain exemplary applications are described herein, it should be understood that the current disclosure is not limited to any particular applications and/or any particular type of response function.

According to some embodiments, a focused blind deconvolution process may be performed by carrying out two sequential focused optimization processes. The first optimization process may be a focused blind interferometric blind deconvolution, which may fit cross-correlations of recorded channel signals to determine cross-correlated response functions subject to a first constraint that the response functions are maximally white. In particular, the first optimization process may include measuring individual channel signals (e.g., with a suitable sensor or receiver corresponding to each channel), and determining cross-correlations of the channel signals, which in some instances, may be characterized as interferometric output signals. Based on the cross-correlated signals, a set of optimized cross-correlated response functions (which may be referred to as optimized interferometric response functions) are determined by imposing the first constraint that the response functions are maximally white fitting the cross-correlated response functions to the cross-correlated signals. In certain embodiments, this constraint may be imposed by employing a regularization term that penalizes the energy of the response function autocorrelations multiplied by non-zero lag times. In this manner, the first optimization process may result in solutions for the cross-correlated response functions that are based on response functions which are heuristically as white as possible.

The second optimization process may be a focused phase retrieval process that fits response function solutions to the optimized cross-correlated response functions from the first optimization process subject to a second constraint that the response functions are maximally front-loaded. In particular, the second optimization process may fit the cross-correlated response functions associated with the most front-loaded channel, which in some applications, may correspond to a channel associated with a sensor that is closest to a position of a source signal. In certain embodiments, this constraints may be imposed by employing a regularization term that penalizes the energy of the most front-loaded response function multiplied by non-zero times. As a result, the second optimization process may minimize the second moment of the squared response functions, thereby providing solutions for the response functions that are as front-loaded as possible.

In some embodiments, the first and/or second optimization processes discussed above may be performed iteratively until the cross-correlated response functions and/or response functions converge to provide the desired optimized functions. Moreover, in some instances, the focusing constraints discussed above may be varied throughout the iterative optimization processes. For example, one or both of the above-described optimization processes may begin by imposing a strict focusing constraint during the initial iterations. Subsequently, and as elaborated on below, the focusing constraints may be relaxed at later iterations to further refine the estimations and seek local optimums that provide better solutions.

In one embodiment, a system may include two or more sensors configured to detect and record signals. For example, in some instances, the system may include ten or more sensors. Each sensor may define a channel, and each channel signal may be defined by a convolution of a source signal and a response function, such that each channel has an associated response function. The system may further include a controller that may be configured to perform a focused blind deconvolution of the channel signals to determine the response functions for each channel. For example, the controller may include a processor that is configured to determine cross-correlations of the channel signal, and subsequently fit cross-correlated response functions (e.g., interferometric response functions), to the channel signal cross-correlations by imposing a first focusing constraint to ensure that the response functions are maximally white. Using these fitted cross-correlated response functions, the controller may subsequently fit individual response functions corresponding to the individual channels by imposing a second focusing constraint to ensure that the response functions are maximally front loaded.

According to some aspects, the inventors have appreciated that it may be beneficial to arrange the two or more sensors in a system such that the sensors record dissimilar signals. In particular, the inventors have appreciated that such dissimilar signals may aid in performing a focused blind deconvolution process as described herein, for example, by avoiding solutions to the deconvolution process that are not coprime. In some embodiments, two sensors may be spaced from one another by a distance corresponding to at least one wavelength of an expected source signal that the sensors are configured to detect. Additionally, the sensors may be positioned at locations that are non-symmetric relative to the associated source. In the absence of any unexpected symmetries in the response of a system, such a spacing and relative positioning may aid in ensuring that the signals recorded at each sensor are sufficiently dissimilar for use with the methods disclosed herein. For example, in seismic applications, a spacing between adjacent sensors of ones to tens of meters (e.g., about 5 m) may be suitable to provide sufficiently dissimilar recorded signals. In other applications, such as room acoustic applications a spacing between adjacent sensors (such as microphones), may be on the order of centimeters to meters.

In view of the above, appropriate types of signal sources may correspond to any appropriate device capable of generating a desired signal which may be a random and/or controlled signal as the disclosure is not limited in this fashion. For example, depending on the embodiment, signal sources may include, but are not limited to, random mechanical sources (e.g., an operating drill bit), seismic acoustic sources, speakers, radar or other electromagnetic sources, imaging systems, and/or any other appropriate device capable of generating acoustic signals, elastic signals, electromagnetic signals, image data, and/or any other desired signal. Correspondingly, sensors which may detect the signals emitted by these sources may include, but are not limited to, geophones, hydrophones, pressure sensors, microphones, photosensitive detectors, electromagnetic sensitive detectors, and/or any other appropriate type of sensor capable of detecting the desired signals transmitted from a corresponding signal source. Accordingly, it should be understood that the disclosed methods are generally applicable to a number of different systems implementing a variety of different sources and sensors.

In some embodiments, the signals received by the plurality of sensors in a system may include both a desired source signal as well as signals emitted from other controllable active sources. For example, in drilling applications, a non-random source, such as an acoustic source for imaging purposes, may emit an acoustic pulse which is overlapped with desirable arbitrary noise from a drill bit being operated. This may complicate the analysis of the response signals recorded by the corresponding plurality of sensors since they record a mixture of source signals, which are independently convoluted by the impulse response signals. Accordingly, in some embodiments, prior to using the signals recorded by the plurality of sensors in the methods described herein, it may be desirable to isolate those portions of the received signals corresponding to the desirable source while neglecting the portions of the signals corresponding to the undesirable sources. In such an embodiment, the response signals recorded by the plurality of sensors may be subject to an independent component analysis to separate or de-blend the blended source signals. The identified portions of the recorded signals corresponding to the desirable source may then be used as the measured signals for use with the methods described herein for focused blind deconvolution.

As noted above, in some instances, the focused blind deconvolutions techniques described herein may be used in connection with seismic applications, which may include drilling applications. For example, in some embodiments, a drilling system may include a tool, such as a drill, configured to be positioned at an end of a drill string, which may be positioned at a bottom of a borehole in a drilling operation. The drilling system may include at least two sensors (e.g., 10 or more sensors) spaced from the tool and configured to detect a source signal generated by the tool, such as a noise signal from a drill bit. For example, the sensors may be positioned on the drill string, in a separate borehole, at the surface of the medium in which the drilling operation is being performed, and/or at the surface of an itermediating medium (e.g., at an ocean-earth interface). The sensors, which may be spaced from one another by a distance corresponding to at least one wavelength of the source signal, may detect signals which may be used as inputs to a focused blind deconvolution technique to determine impulse responses of the medium, which may correspond to the subsurface Green's functions of the medium. In some embodiments, the sensors may include seismic receivers (e.g., pressure sensors, accelerometers and/or or other suitable receivers), which may be configured to measure acoustic and/or elastic signals from the medium. Suitable pressure sensors include, but are not limited to, borehole receivers and/or surface receivers such as geophones and hydrophones, and the pressure sensors may be configured to measure any suitable type of signal, such as pressure waves and/or shear waves.

Once determined from the focused blind deconvolution process, the subsurface Green's functions may be used to determine various properties of the medium, such as acoustic and/or elastic properties, which may be important in a drilling operation. For example, such properties may be determined via a waveform inversion process by which a velocity model of the medium may be obtained. Moreover, in some embodiments, one or more aspects of the drilling operation may be controlled based on the Green's functions determined by the focused blind deconvolution technique. For example, the drilling process may be controlled to change various drilling parameters, such as a drilling pathway or course through the medium, a drill speed, applied torque, and/or a mud weight. Alternatively, the information may be used to halt a drilling operation and/or output a warning to an operator if measured properties exceed a threshold difference from expected medium properties. However, it should be understood that the current disclosure is not limited to any particular adjustments to a drilling operation, and that a drilling process need not be adjusted in some embodiments (e.g., in surveying applications).

While the embodiments described herein may include a drill bit (or similar tool arrangement configured to form a borehole or similar structure in a medium), it should be understood that the disclosed systems also may be embodied as sensing tools that do not include a drill bit. For example, such embodiments of sensing tools may be used in connection with a drilling operation (e.g., to provide information related to the medium being drilled), and/or may be used in non-drilling applications, such as for geological surveying applications (including data acquisition form the surface of the Earth), medical imaging, or physiological parameter estimation applications.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a flow chart of an illustrative focused blind deconvolution process 100, according to some embodiments. Process 100 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect.

Process 100 begins at act 110, where two or more signals are measured. For example, the signals may be measured by two or more sensors that are spaced from one another such that the signals are sufficiently dissimilar, as discussed above. In some applications, the two or more measured signals may define data channels that reflect convolutions of a source signal and a response function (e.g., an impulse response) associated with each respective channel. For example, in some embodiments in which the signals are measured by two or more sensors, the response function for a particular channel may depend on the system properties that affect and alter the source signal as it travels to the particular sensor corresponding to that channel.

Next, process 100 proceeds to act 120, where the measured signals are used to determine estimated interferometric response functions (i.e., estimated cross-correlations of the response functions) via a focused interferometric blind deconvolution process. An exemplary process for performing focused interferometric blind deconvolution is described in more detail below in connection with FIG. 2.

Figure 3:
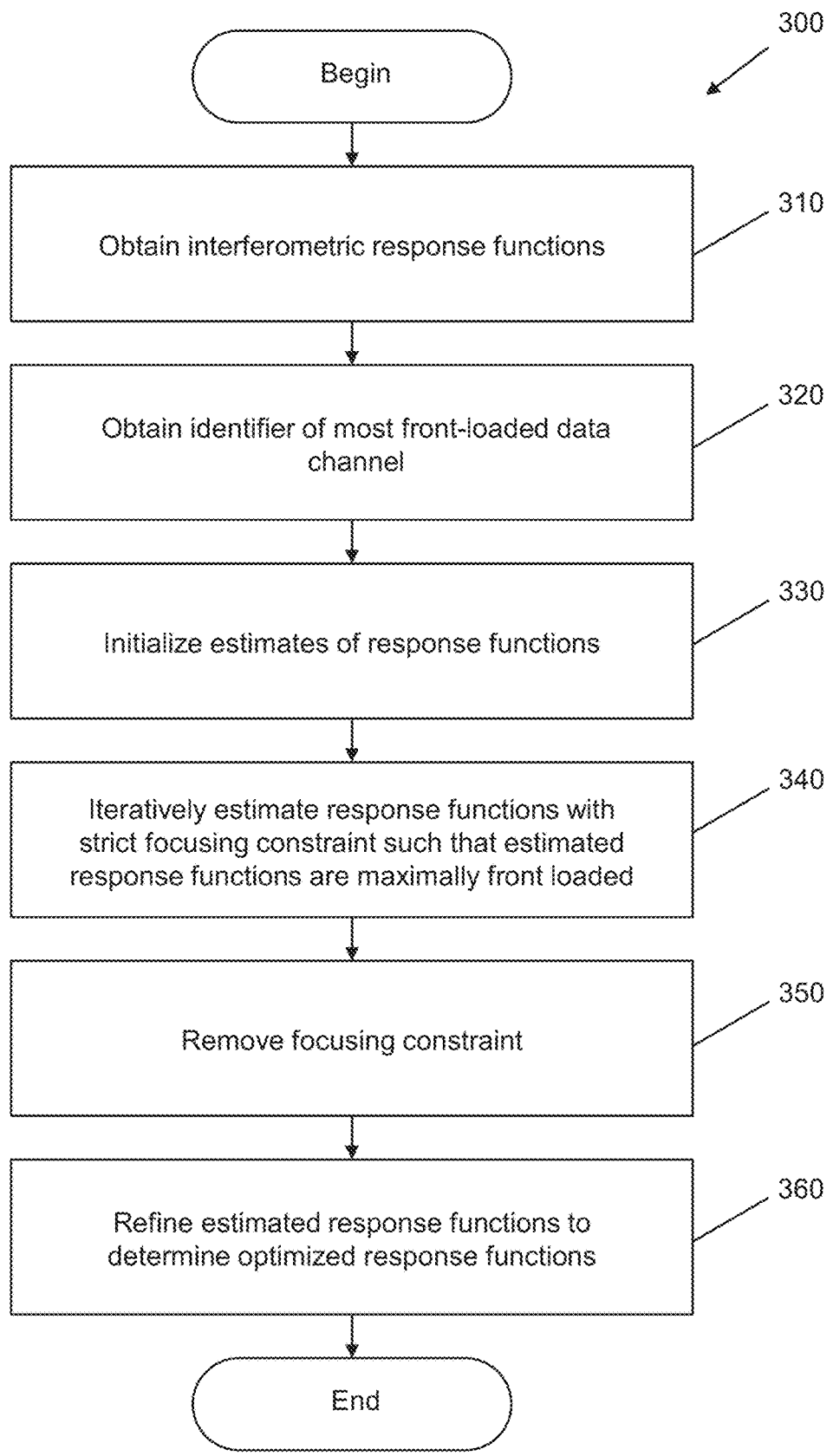
FIG. 3 is a flow chart depicting a focused phase retrieval process, according to some embodiments.

Next, process 100 proceeds to act 130, where estimated response functions of the system are determined using a focused phase retrieval process based on the estimated interferometric response functions determined at act 120. For example, response functions for each data channel corresponding to each sensed signal from act 110 may be estimated at act 130. An exemplary process for performing focused phase retrieval is described in more detail below in connection with FIG. 3.

Next, process 100 optionally proceeds to act 140, where one or more aspects of a system may be controlled based on the response functions estimated at act 130. For example, in drilling applications, one or more aspects of a drilling operation may be adjusted based on the response functions as discussed above.

Next, Process 100 optionally proceeds to act 150, where information may be displayed based on the estimated response functions from act 130. For example, in drilling applications where the response functions may correspond to subsurface Green's functions, the response functions may be used to generate and display a model of a medium, such as an acoustic and/or elastic velocity model of the medium. Alternatively, and/or in addition to the above, the generated models and/or the response functions may be stored in an appropriate non-transitory computer readable storage medium for subsequent retrieval and use at 160.

Figure 2:
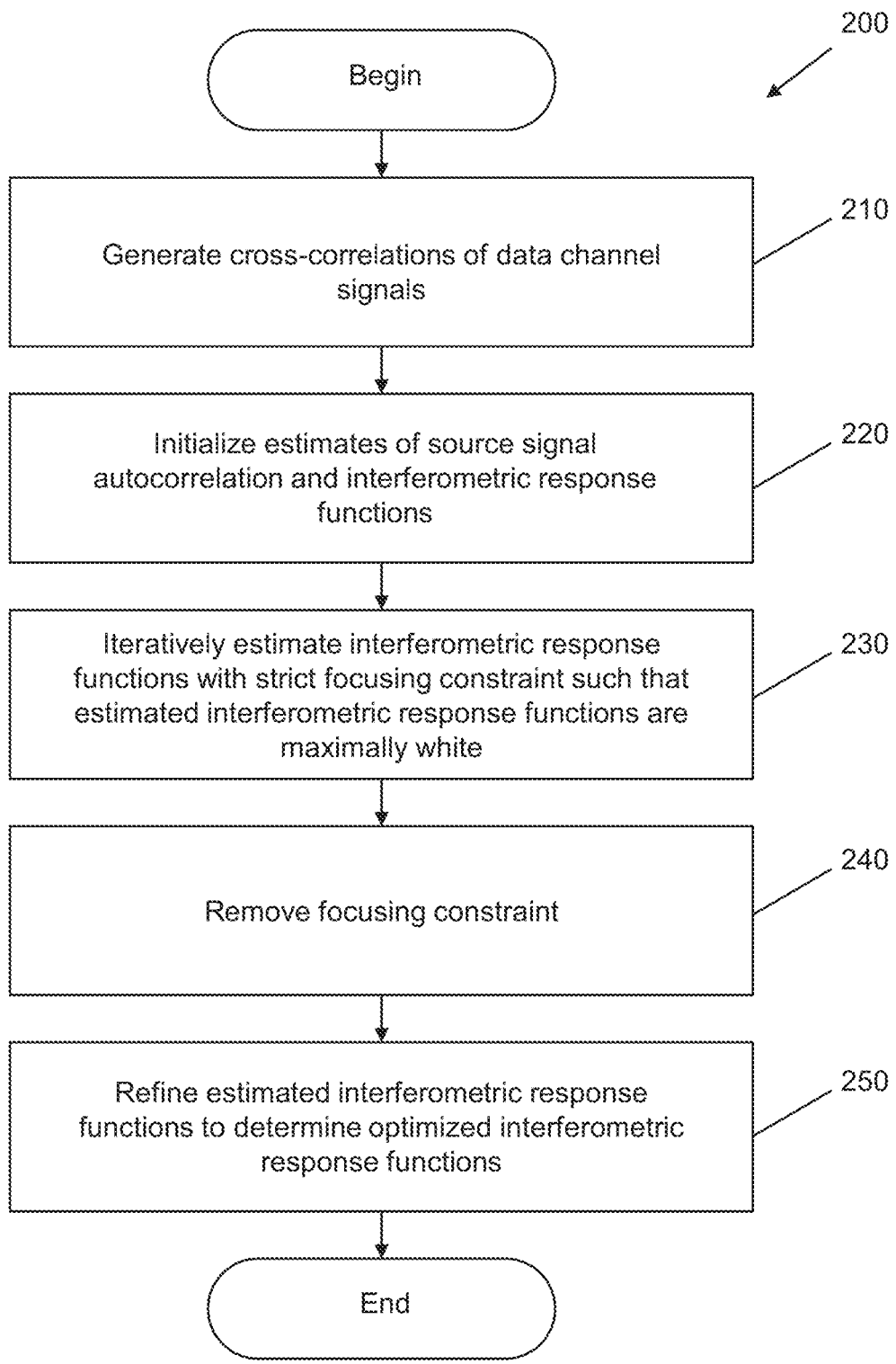
FIG. 2 is a flow chart depicting a focused interferometric blind deconvolution process, according to some embodiments.

FIG. 2 is a flow chart of an illustrative focused interferometric blind deconvolution process 200, according to some embodiments. Process 200 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect.

Process 200 begins at act 210, where cross-correlations of data channel signals may be generated. For example, a cross-correlation process may be performed on measured time-dependent signals from two or more sensors to generate the cross-correlations. Next, the process proceeds to act 220, where estimates of a source signal autocorrelation and interferometric response functions are initialized. In one embodiment, the source signal autocorrelation is initialized such that it has a value of zero for all times that are not equal to zero, and it has a value of one at zero time. The interferometric response functions may then be initialized to random numbers at all time values for all cross-correlations of response functions of different channels, to a value of zero for all autocorrelations of response functions at non-zero times, and to a random number for all autocorrelations of response functions at zero time.

Next, process 200 continues to act 230, where the interferometric response functions are iteratively estimated subject to a strict focusing constraint. In some embodiments, the strict focusing constraint may be selected such that the estimated interferometric response functions are maximally white. In one example, this constraint may be implemented by including a regularization parameter that penalizes the optimization of the response function autocorrelations at non-zero times. For example, a large value may be selected for the regularization parameter in act 230, which may force the estimated response function autocorrelations to be equal to zero at non-zero time values while optimizing the interferometric response functions. In this manner, the strict focusing constraint of act 230 may approximately provide a global optimum for the estimated interferometric response functions that are maximally white and fit the cross-correlated channel data. Without wishing to be bound by theory, this may help the process to avoid becoming stuck in a local, rather than a global, solution.

Next, process 200 proceeds to act 240, where the strict focusing constraint may be removed. Finally, process 200 proceeds to act 250 where the estimated interferometric response functions obtained from act 230 are further refined to determine optimized interferometric response functions that fit to the cross-correlations of the channel data from act 210. For example, further iterations starting with the global optimum from act 230 may be performed to identify a local optimum for the estimated interferometric response functions. An example of this process is detailed further below Referring now to FIG. 3, a flow chart of an illustrative process for a focused phase retrieval process 300 is described in more detail. Process 300 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect.

Process 300 begins at act 310 where interferometric response functions are obtained. For example, the interferometric response functions may be optimized interferometric response functions determined by the focused interferometric blind deconvolution process described above in connection with FIG. 2. Next, process 300 continues to act 320 where an identifier of a most front-loaded data channel is identified. For example, in many systems, the most front-loaded data channel may correspond to a sensor (or other suitable receiver) that is positioned closest to a position of a source signal. In such an embodiment, the signal from the sensor closest to a source may be defined as the most front-loaded channel. Alternatively, the various signals may be compared to one another to determine a signal with a maximum signal intensity at a given initial time point. The sensor corresponding to the signal with the maximum signal intensity at the initial time point may then be set as the most front-loaded channel for further processing.

Next, process 300 proceeds to act 330, where estimates of response functions are initialized. In one embodiment, the response functions may be initialized with random values for the response functions associated with all channels other than the most-front loaded channel for all time values, as well as with random values for the most front-loaded channel at zero time. For all non-zero time values, the response function of the most front-loaded channel is initialized to zero.

Next, process 300 proceeds to act 340, where the response functions for each channel are iteratively estimated subject to a strict focusing constraint by which the estimated response functions are maximally front-loaded. In one example, this strict focusing constraint may be implemented by including a regularization parameter that penalizes the optimization of the response function for the most front-loaded channel at non-zero times. For example, a large value may be selected for the regularization parameter in act 340, which forces the estimated response function for the most front-loaded channel to be equal to zero at non-zero time values while optimizing the set of response functions. In this manner, the strict focusing constraint of act 340 may provide a global optimum for the estimated response functions that are maximally front loaded and fit the interferometric response functions from act 310.

Next, process 300 proceeds to act 350, where the focusing constraint may be removed. Finally, process 300 proceeds to act 360 where the estimated response functions obtained from act 340 are further refined to determine optimized response functions that fit to the interferometric response functions from act 310. For example, further iterations starting with the global optimum from act 340 may be performed to identify a local optimum for the estimated response functions. Examples of this process are provided below.

Figure 4:
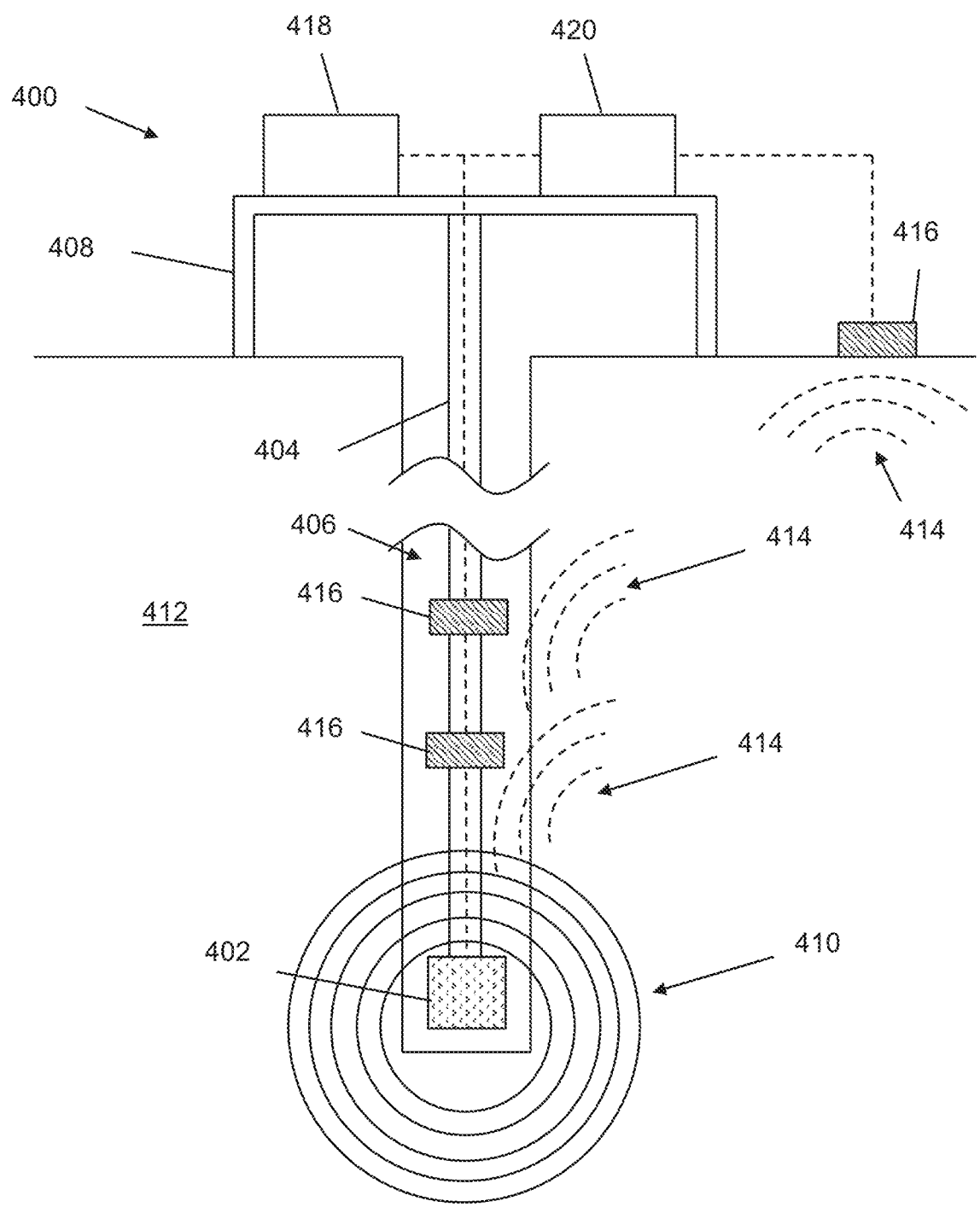
FIG. 4 is a schematic representation of a drilling system, according to some embodiments.

Referring now to FIG. 4, an illustrative embodiment of a drilling system 400 that may be used in connection with any of the embodiments of the focused blind deconvolution and related process described herein is depicted. The drilling system 400 includes a tool 402, such as a drill bit, that is configured to be positioned at the end of a drill string 404. As illustrated the drill string 404 may be supported by a support structure 408 (e.g., a derrick or other suitable support structure) and the drill string may extend into a borehole 406 formed in a medium 412 (e.g., the earth). Depending on the particular type of drilling operation, the drilling system may include conventional drilling equipment 418, such as one or more conventional pumps, motors, storage tanks, and so on, as are known in the art.

During operation, the tool may generate a source signal 410 (e.g., a noise signal resulting from normal operation of the tool) which may be in the form of acoustic and/or elastic seismic energy, which may propagate into the surrounding medium 412. Depending on the particular properties of the medium, the source signal may be transformed into signals 414 that may be measured at two or more sensors 416 spaced from the tool 402. In particular, each sensor 416 may detect a different signal 414 depending on the response function of the medium 412 (i.e., the impulse response or subsurface Green's function) between the position of the tool 402 and the position of each sensor 416. As illustrated in the figure, the sensors 416 may be positioned on the drill string 404 and/or on the surface of the medium. Alternatively or additionally, sensors may be positioned at other positions within the medium, such as in one or more auxiliary boreholes (not depicted) formed in the medium 412. While three sensors 416 are depicted in this embodiment, other embodiments may include only two sensors, or more than three sensors as the disclosure is not limited to any particular number of sensors.

The drilling system 400 further includes a controller 420 operatively coupled to the sensors 416, as well as to the tool 402 and drilling equipment 418. The controller may include at least one hardware processor and at least one non-transitory computer-readable storage medium storing processor executable instructions that, when executed by at least one hardware processor, cause the at least one hardware processor to perform a focused blind deconvolution process, as described herein, based on the signals 414 detected by sensors 416 to determine the response functions of the medium (i.e., the subsurface Green's functions). In some embodiments, the controller may control operation of the tool 402 based on the response functions determined by the focused blind deconvolution process. For example, the response functions may provide information related to the properties of the medium, and the controller may adjust one or more operational parameters of the system 400 based on the properties. Alternatively, the controller may output an alert or other information related to the detected properties of the medium to an operator using an appropriate display as described previously.

While the above embodiment has been illustrated relative to a drilling system, the disclosed embodiments may be used for processing signals emitted by any appropriate signal source and received by multiple sensors. This may include acoustic, radar, seismic, light, and/or any other appropriate type of signal source and corresponding sensors as the disclosure is not limited to only these specific embodiments.

Figure 5:
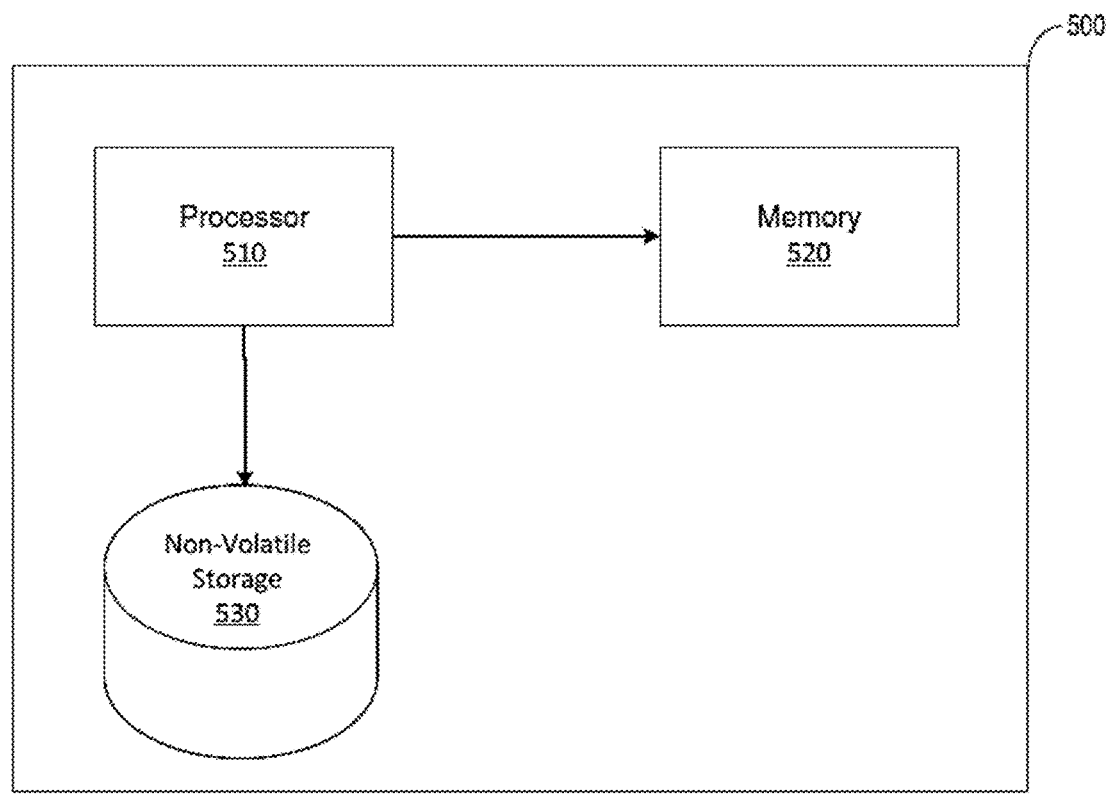
FIG. 5 is a block diagram of an illustrative computer system that may be used in implementing some embodiments.

An illustrative implementation of a computer system 500 that may be used in connection with any of the embodiments of the technology described herein is shown in FIG. 5. The computer system 500 includes one or more processors 510 and one or more articles of manufacture that comprise non-transitory computer-readable storage media (e.g., memory 520 and one or more non-volatile storage media 530). The processor 510 may control writing data to and reading data from the memory 520 and the non-volatile storage device 530 in any suitable manner, as the aspects of the technology described herein are not limited in this respect. To perform any of the functionality described herein, the processor 510 may execute one or more processor-executable instructions stored in one or more non-transitory computer-readable storage media (e.g., the memory 520), which may serve as non-transitory computer-readable storage media storing processor-executable instructions for execution by the processor 510.

Example: Focused Blind Deconvolution

As noted above, some aspects described herein relate to methods and/or processes for performing focused blind deconvolution on a set of two or more channel signals (e.g., signals recorded at two or more sensors). According to some examples, focused blind deconvolution techniques may described in connection with various mathematical frameworks, as discussed below.

In some instances, the time response of a system to a source signal with signature s(t) is to produce n multichannel outputs $d_i(t)$ (e.g., corresponding to n sensors or other suitable receivers). The n observations or channel outputs may be modeled as the output of a linear system that convolves (denoted by *) the source s(t) with the impulse response functions of the system:

$$d_i(t) = \{s * g_i\}(t) \quad (1)$$

In equation (1) above, $g_i(t)$ is the $i^{th}$ channel impulse response function, and $d_i(t)$ is the $i^{th}$ channel output. The impulse response functions $g_i(t)$ may contain physically meaningful information about the individual channels and about the physical response of the system. Towards the goal of extracting the vector of impulse responses $[g_1(t), \ldots, g_n(t)]$, or more simply $[g_i(t)]$, a least-squares fitting process of the channel output vector $[d_1(t), \ldots, d(t)]$, or more simply $[d_i(t)]$, is performed. This corresponds to a least-squares multichannel deconvolution of the channel outputs with an unknown blurring kernel (i.e., the source signature s(t)). It is well known that severe non-uniqueness issues are inherent to multichannel blind deconvolution (BD). In particular, there may be many possible estimates of $[g_i(t)]$, which when convolved with the corresponding s(t), will result in the recorded $[d_i(t)]$. Accordingly, in this example, two additional constraints are added to the BD framework that seek a solutions where $[g_i(t)]$ is: 1) maximally white, which is encoded as the energy of the impulse response autocorrelations focusing near zero lag (i.e., energy diminishing at non-zero lags); and 2) maximally front loaded, which is encoded as the energy focusing near zero time of the most front-loaded impulse response.

As used herein, these constraints are referred to as focusing constraints, and the resulting BD analysis is referred to as focused blind deconvolution (FBD). As detailed below, the focusing constraints are relaxed as the iterations of the FBD process progress to enhance fitting of the channel outputs. In this manner, FBD employs the focusing constraints to resolve the indeterminacy inherent to the BD problem.

As explained below, the two above-noted focusing constraints may be applied sequentially after decomposing the BD problem into two separate least-squares optimization problems. The first problem, where it is sufficient to employ the first focusing constraint that [$g_i(t)$] is maximally white, fits the interferometric channel outputs [$d_{ij}(t)$] (also referred to as the cross-correlated channel outputs), rather than the raw channel outputs [$d_i(t)$], and solves for the interferometric impulse responses [$g_{ij}(t)$]. The second problem uses the outcome of this first problem and completes the FBD by employing the second focusing constraint that [$g_i(t)$] is maximally front-loaded and solving for the impulse responses [$g_i(t)$] from their cross-correlations [$g_{ij}(t)$]. As discussed below, in some instances, FBD can effectively retrieve [$g_i(t)$] provided that the time durations of the channel outputs are long enough to contain the unknown impulse responses, and that the channels are sufficiently dissimilar in the sense of their transfer function polynomials being coprime in the z-domain.

For example, in the seismic inversion context, an approximate duration length of the unknown impulse responses can be determined by utilizing the source and receiver locations and an estimated wave speed. The first condition above is economically beneficial, as usual drilling practice enables experiments to record noisy data for a time period much longer compared to the wave-propagation time. Also, since drilling is occurring anyway, its use as a signal source to estimate [$g_i(t)$] is a free side benefit. As explained below, the second condition can be satisfied in seismic experiments by deploying sufficiently dissimilar receivers, which may be arrayed variously in a borehole, or surface-seismic geometry. For example, the receivers (i.e., sensors as described herein) may be sufficiently distanced from one another, and positioned at assymetric locations relative to the signal source, such that the signals received at these receivers are different. In such applications, the elements of [$g_i(t)$] correspond to the unique subsurface Green's functions evaluated at the i-indexed locations of each receiver.

Moreover, retrieval of the Green's function is also the subject of seismic interferometry applications, where the temporal cross correlation (denoted by $\otimes$) between two records at two receivers with indices i and j:

$$d_{ij}(t) = \{d_i \otimes d_j\}(t) = \{s_a * g_{ij}\}(t) \quad (2)$$

is treated as a proxy for the cross-correlated or interferometric Green's function $g_{ij} = g_i \otimes g_j$. In equation (2) above, $s_a = s \otimes s$ denotes the source autocorrelation. A classic result in interferometry suggests that a summation on the $g_{ij}$ over various noisy source, evenly distributed in space, will result in the Green's function due to a virtual source at one of the receivers. In the absence of multiple evenly distributed noisy sources, the interferometric Green's functions can still be directly used for imaging, though this requires knowledge of the source signature. Equation (2) above shows that the goal of interferometry (i.e., the construction of $g_{ij}$ given $d_{ij}$, is impeded by the source autocorrelation $s_a$. In an impractical situation with a zero-mean white noisy source, the $d_{ij}$ would be precisely proportional to the $g_{ij}$ However, this is not at all realistic, and thus the FBD techniques described herein do not assume a white source signature and do not use any concepts like virtual sources. Instead, the FBD techniques described herein may perform a blind deconvolution in the presence of a single noisy source and/or without any assumptions related to the distribution of multiple noisy sources. In the presence of multiple noisy sources, FBD may be preceded by a blind source separation process, e.g., a deblending process as described below.

As used herein, z-domain representations are denoted using corresponding capital letters. For example, the $i^{th}$ channel output after a z-transform is denoted by:

$$D_i(z) = \sum_{t=0}^{T} d_i(t) z^{-t}.$$

The traditional approach to perform a BD is a least squares fitting of the channel output vector [$d_i$: $\{0, \ldots, T\} \to \mathbb{R}$] to jointly optimize two functions: the impulse response vector associated with the different channels [$g_i$: $\{0, \ldots, \tau\} \to \mathbb{R}$] and the source signature s: $\{0, \ldots, T-\tau\} \to \mathbb{R}$. The joint optimization can be suitably carried out using alternating minimization: in one cycle, one function is fixed and the second is optimized, and in the second cycle, the second function is fixed and the first is optimized. Several cycles are expected to be performed to reach convergence. In some implementations, a Least-squares Blind Deconvolution (LSBD) process ban be defined as a basic formulation that minimizes the least-squares functional:

$$U(s, [g_i]) = \sum_{k=1}^{n} \sum_{t=0}^{T} \{d_k - \{s * g_k\}(t)\}^2 \quad (3)$$

$$(\hat{s}, [\hat{g}_i]) = \underset{s,[g_i]}{\operatorname{argmin}} U \quad (4)$$

$$\text{subject to } \sum_{t=0}^{T} s^2(t) = 1 \quad (5)$$

In equations (3), (4), and (5), $\hat{s}$ and [$\hat{g}_i$] denote the predicted or estimated functions corresponding to the unknowns s and [$g_i$], respectively. Equation (5) fixes the energy (i.e., the sum-of-squares) norm of s in order to resolve the scaling ambiguity. In order to effectively solve this problem, it is desirable for the domain length T+1 of the outputs $d_i$ to be much longer than the domain length $\tau$+1 of the elements in the unknown vector [$g_i$].

As noted above, and without wishing to be bound by theory, ill-posedness is a major challenge of BD (including the LSBD formulation above). For instance, when the number of channels n=1, an undesirable minimizer for equation (3) would be the temporal Kronecker $\delta(t)$ for the impulse response, making the source signature equal to the channel output. Even with n>1, the LBSD problem can only be solved up to some indeterminacy. To quantify the ambiguity, one can consider a filter $\phi(t) \neq \delta(t)$ and its inverse $\phi^{-1}(t)$ (where $\phi * \phi^{-1} = \delta$) that can be applied to each element of [$g_i$] and s, respectively and leave their convolution unchanged:

$$d_i(t) = \{s * g_i\}(t) = \{\{s * \phi^{-1}\} * \{g * \phi\}\}(t) \quad (6)$$

If furthermore $s * \phi^{-1}$ and $g_i * \phi$ obey the constraints otherwise placed on s and [$g_i$], namely that s and each element of [$g_i$] should have duration lengths T-$\tau$+1 and $\tau$+1, respectively, and the unity of the source energy, then there is a true ambiguity that is not resolved by the constraints. As a result, $\phi$ may be said to belong to a set $\mathbb{Q}$ of undetermined filters. This formalizes the lack of uniqueness: for any possible desirable solution ($\hat{s}$, [$\hat{g}_i$]) and every possible $\phi \in \mathbb{Q}$, ($\hat{s} * \phi^{-1}$, [$\hat{g}_i * \phi$]) is an additional possibly undesirable solution. Taking all $\phi \in \mathbb{Q}$ spawns all solutions in a set P that equally minimize the least-squares functional in equation (3). Accordingly, in the z-domain, the elements of [$\hat{G}_i$] of almost any solution in P share some common root(s), which are associated with its corresponding unknown filter $\Phi(z)$. In other words (using the jargon of complex analysis), the channel polynomials in [$\hat{G}_i$] of nearly all the solutions are not coprime. A particular element in P has its corresponding $[\hat{G}_i]$ with the fewest common roots. This is referred to herein as the coprime solution.

The aim of the FBD techniques described herein is to seek the coprime solution of the LSBD problem discussed above. Otherwise, the channel polynomials of $[\hat{G}_i]$ will typically be less sparse and less front-loaded in the time domain owing to the common roots that are associated with the undetermined filter φ of equation (6). For example, including a common root r to the polynomials in $[\hat{G}_i]$ implies an additional factor (z−r) that corresponds to subtracting [r $g_i(t)$] from [$g_i(t+1)$] in the time domain, so that the sparsity is likely to reduce. Therefore, one intention and innovation of FBD is to minimize the number of common roots in the channel polynomials of $[\hat{G}_i]$ associated with Φ(z).

Towards this end, FBD solves a series of two least-squares optimization problems with focusing constraints. These constraints, described below, can guide FBD to converge to the desired coprime solution. The first problem in FBD considers fitting the cross-correlated channel outputs to jointly optimize two functions: the impulse-response cross-correlations between every possible channel pair and the source-signature autocorrelation. The focusing constraint in this problem resolves the indeterminacy due to the amplitude spectrum of the unknown filter φ in (6) such that the impulse responses are maximally white. Then, the second problem completes the FBD by fitting the above-mentioned impulse-response cross-correlations to estimate [$g_i$]. The focusing constraint in this problem resolves the indeterminacy due to the phase spectrum of the unknown filter φ such that [$g_i$] is maximally front-loaded. These two problems solved together resolve the indeterminacies noted above of existing BD methods.

Example: Focused Interferometric Blind Deconvolution

In order to isolate and resolve the indeterminacy due to the amplitude spectrum of φ(t), a reformulated multichannel blind deconvolution problem may be considered. This reformulation deals with the cross-correlated or interferometric channel outputs, $d_{ij}:\{-T, \ldots, t\} \to \mathbb{R}$, as in equation (2), between every possible channel pair, therefore ending the indeterminacy due to the phase spectrum of φ(t). A discussion of a framework for Focused Interferometric Blind Deconvolution (FIBD) first begins with a discussion of a framework for Interferometric Blind Deconvolution (IBD), as defined below in connection with equations (7) and (8). The optimization in the IBD problem is carried out over the source-signature autocorrelation $s_a: \{-T+\tau, \ldots, T-\Sigma\} \to \mathbb{R}$ and the cross-correlated or interferometric impulse responses $g_{ij}:\{-\tau, \ldots, \tau\} \to \mathbb{R}$:

$$V(s_a, [g_{ij}]) = \sum_{k=1}^{n}\sum_{l=k}^{n}\sum_{t=-T}^{T} \{d_{kl}(t) - \{s_a * g_{kl}\}(t)\}^2 \quad (7)$$

$$(\hat{s}, [\hat{g}_i]) = \underset{s,[g_i]}{\arg\min} V \quad (8)$$

subject to $s_a(0) = 1; s_a(t) = s_a(-t)$

In these equations, the (n+1)n/2-vector of unique interferometric responses [$g_{11}$, $g_{12}$, ..., $g_{22}$, $g_{23}$, ..., $g_{nn}$] is denoted simply by [$g_{ij}$]. The interferometric outputs $d_{ij}$ are fit after max normalization while imposing $s_a$=1 to assist the convergence to a solution, where the inequality condition $s_a(t) \le s_a(0) \forall t$ is satisfied. It also conveniently resolves the scaling ambiguity. More generally, the function $s_a(t)$ is the autocorrelation of s(t) if and only if the Toeplitz matrix formed from its translates is positive semidefinite i.e., Toeplitz($s_a$)≥0. This is a result known as Bochner's theorem. This semidefinite constraint could be realized by projecting Toeplitz($s_a$) onto the cone of positive semidefinite matrices at each iteration of the nonlinear least-squares iterative method; however, in the numerical experiments, convergence to acceptable solutions is observed by just using the weaker constraints of IBD, when the data noise is sufficiently small. Moreover, employment of stronger constraints like Toeplitz($s_a$)≥0 would increase the computational burden.

Similar to LSBD, IBD has unwanted minimizers obtained by applying a filter $\psi^{-1}$ to $s_a$ and ψ to each element of [$g_{ij}$], but it is easily computed that ψ has to be real and nonnegative in the frequency domain (|z|=1) and related to the amplitude spectrum of φ(t). Therefore, its indeterminacy is lesser compared to that of the LSBD approach.

In contrast to the above described frameworks, FIBD starts by seeking a solution of the underdetermined IBD problem where the impulse responses are "maximally white," as measured by the concentration of their autocorrelation near zero lag (a Kronecker delta in lag defining pure whiteness). Towards that end, a regularizing term is introduced to equation (7) that penalizes the energy of the impulse response autocorrelations multiplied by the nonzero lag time t, before returning to solving the regular IBD problem. An FIBD framework including such a regularizing term below is shown below in equations (9) and (10):

$$W(s_a, [g_{ij}]) = V(s_a, [g_{ij}]) + \sum_{k=1}^{n}\sum_{t=-\tau}^{\tau} t^2 g_{kk}^2(t) \quad (9)$$

$$(\hat{s}, [\hat{g}_i]) = \underset{s,[g_i]}{\arg\min} W \quad (10)$$

subject to $s_a(0) = 1; s_a(t) = s_a(-t)$

In these equations, α≥0 is an iteration-dependent regularization parameter. A homotopy approach is considered to solve FIBD, where equation (10) is solved in succession for decreasing values of α, the result obtained for previous α being used as an initializer for the cycle that uses the current α. In some instances, convergence to the maximally white solution may not be guaranteed by merely decreasing α monotonically. Nonetheless, a convergence to acceptable impulse responses is observed in numerical examples starting with extremely large values of α, before choosing α=0 and therefore ignoring the regularizing term. The effect of α going to ∞ is given by imposing strict focusing involving $g_{ii}(t)$=0 whenever t≠0 while minimizing the V term.

The focusing constraint resolves the indeterminacy of IBD. Minimizing the energy of the impulse-response auto-correlations $g_{ii}$ proportional to the squared nonzero lag time will result in a solution where the impulse responses are heuristically as white as possible. In other words, FIBD minimizes the number of common roots, associated with the IBD indeterminacy Ψ(z) in the estimated polynomials $\hat{G}_{ij}$, facilitating the goal of FBD to seek the coprime solution.

Example: Focused Phase Retrieval (FPR)

FIBD resolves a component of the LSBD ambiguity and estimates the interferometric impulse responses. This should be followed by phase retrieval (PR): a least-squares fitting of $\hat{g}_i$ to optimize $[g_i]$. The estimation of $[g_i]$ in PR is hindered by the unresolved LSBD ambiguity due to the phase spectrum of φ(t). As described in more detail below, a focusing constraint is used to resolve this remaining ambiguity in PR.

Before discussing Focused Phase Retrieval (FPR) below, a framework for least-squares phase retrieval (LSPR) is discussed in connection with equations (11) and (12). Given the interferometric impulse responses $[g_{ij}]$, the aim of the phase retrieval problem is to estimate the unknown $[g_i]$. In LSPR, this is formulated as:

$$X([g_i]) = \sum_{k=1}^{n}\sum_{l=i}^{n}\sum_{t=-\tau}^{\tau}\{\hat{g}_{kl}(t) - \{g_k \otimes g_l\}(t)\}^2 \quad (11)$$

$$([\hat{g}_i]) = \underset{[g_i]}{\mathrm{argmin}}\, X \quad (12)$$

LSPR is ill-posed. For example, a white filter χ(t)≠δ(t), where χ⊗χ=δ can be applied to each of the impulse responses and leave their cross-correlations unchanged:

$$g_{ij}(t) = \{g_i \otimes g_j\}(t) = \{\{g_i \otimes \chi\} \otimes \{g_j \otimes \chi\}\}(t) \quad (13)$$

If furthermore $g_i*\chi$ obeys the constraint otherwise placed, namely in this case that the impulse responses should have duration length τ, then there exists a true ambiguity not resolved by this constraint. The filter χ(t) is linked to the remaining unresolved component of the LSBD indeterminacy, i.e., the phase spectrum of φ(t).

Accordingly, FPR seeks a solution of the under-determined LSPR problem where $[g_i]$ is "maximally front-loaded." It starts with an optimization that fits the interferometric impulse responses only linked with the most front-loaded channel, indexed by i=f, before returning to solving the regular LSPR problem. In this framework, which is described below in connection with equations (14) and (15), a regularizing term is introduced that penalizes the energy of the most front-loaded response $g_f$ proportional to the time t≠0:

$$Y([g_i]) = \sum_{k=1}^{n}\sum_{t=-\tau}^{\tau}\{\hat{g}_{kf}(t) - \{g_k \otimes g_f\}(t)\}^2 + \beta\sum_{t=0}^{\tau}g_f^2(t)t^2 \quad (14)$$

$$([\hat{g}_i]) = \underset{[g_i]}{\mathrm{argmin}}\, Y \quad (15)$$

In these equations, β is an iteration-dependent regularization parameter. Again, a homotopy approach may be used to solve this optimization problem. The process may start with extremely large values of β, before choosing β=0 and therefore ignoring the regularizing term. The effect of β going to ∞ is given by imposing strict focusing involving $g_f(t)=0$ whenever t≠0 while minimizing the Y term.

FPR chooses the undetermined filter χ such that $g_i*\chi$ has the energy maximally concentrated or focused at the front (small t). Minimizing the second moment of the squared impulse responses will result in a solution where the impulse responses are as front-loaded as possible. Counting on the estimated impulse responses from FPR, the LSBD formulation can be used in order to finalize the BD problem.

As noted above, in some instances, the channel configurations may be chosen so as to be sufficiently dissimilar. In particular, FBD seeks the coprime solution of the ill-posed LSBD problem. Therefore, for the success of FBD, it may be important that the true transfer functions do not share any common zeros in the z-domain. This requirement may be satisfied when the channels are chosen to be sufficiently dissimilar. The channels are said to be sufficiently dissimilar unless there exist a spurious γ and $[g_i]$ such that the true impulse response vector $[g_i^0]=[\gamma*g_i]$. Here, γ is a filter that 1) is independent of the channel index i; 2) belongs to the set $\mathbb{Q}$ of filters that cause indeterminacy of the LSBD problem; 3) doesn't simply shift $g_i$ in time.

Examples: Algorithms for Focused Blind Deconvolution

Using the above discussion of focused blind deconvolution, algorithms were developed and implemented for performing idealized experiments.

The focused interferometric blind deconvolution process is illustrated in Algorithm I. In the algorithm the cross-correlated channel outputs $[d_{ij}]$ are generated and normalized using $d_{11}$ at time zero. The interferometric response functions $g_{ij}$ and the source signal autocorrelation $s_a$ are then initialized using the constraints discussed above. Specifically, $s_a$ at times other than zero is set equal to zero, and at time zero is set to 1. The interferometric response functions may then be initialized to random numbers at all time values for all cross-correlations of response functions of different channels, to a value of zero for all autocorrelations of response functions at non-zero times, and to a random number for all autocorrelations of response functions at zero time. Minimization of W, as described in eq. 10, is then carried out in succession for the limit of α going to infinity, or at least a sufficiently large number, to solve for an approximate global optimal solution. The focusing constraint α is then removed and W, as described in eq. 10, is again minimized to solve for a local optimal solution of the interferometric response functions using the approximate global optimal solution as a starting point.

Algorithm I

Preparation
  generate $[d_{ij}]$ and normalize with $d_{11}(0)$
Initialize $$s_a(t) \leftarrow \begin{cases} 0, & \text{if } t \neq 0 \\ 1, & \text{otherwise} \end{cases}$$

$$g_{ij}(t) \leftarrow \begin{cases} 0, & \text{if } i = j \text{ and } t \neq 0 \\ randn(t), & \text{if } i \neq j \text{ or } t = 0 \end{cases}$$

Strict Focusing (α going to ∞)
  $s_a, [g_{ij}] \leftarrow \underset{s_a,[g_{ij}]}{\mathrm{argmin}}V(s_a, [g_{ij}])$
  s.t. $s_a(0) = 1$; $s_a(t) = s_a(-t)$;
  ∀i $g_{ii}(t) = 0$ whenever $t \neq 0$
Remove Focusing Constraint (α = 0)
  $\hat{s}_a, [\hat{g}_{ij}] \leftarrow \underset{s_a,[g_{ij}]}{\mathrm{argmin}}V(s_a, [g_{ij}])$
  s.t. $s_a(0) = 1$; $s_a(t) = s_a(-t)$;

Next, the solution of the interferometric response functions from Algorithm 1 is input to Algorithm II for focused phase retrieval. An index of the most front loaded channel is then identified prior to initialization of the response functions. Specifically, the response functions may be initialized with random values for the response functions associated with all channels other than the most-front loaded channel for all time values, as well as with random values for the most front-loaded channel at zero time. For all non-zero time values, the response function of the most front-loaded channel is initialized to zero. Y in eq. 14 is then minimized with strict focusing with β going towards infinity to obtain an approximate global solution of the response functions assuming a maximally front loaded signal. The focusing constraint is then removed by setting β to zero and minimizing X in eq. 11 to obtain a local optimal solution of the response functions using the approximate global solution as a starting point.

Algorithm II

Preparation
  get $[\hat{g}_{ij}]$ using FIBD in Algorithm I
Parameters
  index of the most front-loaded channel f
Initialize
$$g_i(t) \leftarrow \begin{cases} 0, & \text{if } i = f \text{ and } t \neq 0 \\ randn(\,), & \text{if } i \neq f \text{ or } t = 0 \end{cases}$$
Strict Focusing (β going to ∞)
  $[g_i] \leftarrow \underset{[g_i]}{\operatorname{argmin}} Y([g_i])$
  s.t. $g_f(t) = 0$ whenever $t \neq 0$
Remove Focusing Constraint (β = 0)
  $[\hat{g}_i] \leftarrow \underset{[g_i]}{\operatorname{argmin}} X([g_i])$

Example: Idealized Experiment

An idealized experiment was conducted with n=20, τ=30, and T=600. The aim was to reconstruct the true impulse-response vector from the channel outputs generated using a Gaussian random source signal for testing purposes. First, this was done using least-squares blind deconvolution with three different initial estimates of the source and response signals. Each of these trials converged to different solutions with channel-output misfit for all three solutions being less than about $10^{-5}$ while the impulse response misfit was greater than 0.5. This is consistent with the non-uniqueness of this solution method and that such a process provides insufficient resolution. In contrast, the focused blind deconvolution methods described herein, and as implemented in algorithms I and II above, resulted in a final misfit for the channel outputs of less than approximately $10^{-7}$ and less than approximately $10^{-1}$ for the impulse response functions. This confirms that the disclosed methods resolve the ambiguity associated with the prior methods of implementing blind deconvolution while also accurately recovering the true interferometric impulse response.

Example: Similar Sensors

To confirm the desirability of using dissimilar sensors, impulse responses that were simply offset by a fixed time-translation were used in an example similar to that above. Due to the impulse responses at the channels not being sufficiently dissimilar the recovered interferometric impulse responses did not match the true signal and exhibited an error on the order of about (0.41). This emphasizes the desire to design a system to have sufficiently different sensors.

Example: Focusing Constraints

In another idealized experiment, similar to that described above, interferometric blind deconvolution was attempted without the described focusing constraints. This was done by setting the focusing constraints to zero in the algorithms detailed above. The error in the interferometric impulse responses obtained without the focusing constraints (0.14) was significantly higher than the error obtained using the focusing constraints (0.001). Similarly, the error in the response functions obtained using a least squares phase recovery (0.45) was greater than the error using focused phase recovery (0.01) as detailed herein. This confirms the benefit in implementing the focusing constraints detailed herein.

Example: Application to Seismic Models

The described algorithms were applied to a realistic scenario involving seismic-wave propagation in a complex 2-D structural model, which is known as the Marmousi model in exploration seismology. An unknown band-limited source signal, e.g., due to a drill bit, was injected into this model for 8.8 s. An acoustic time-domain staggered-grid finite-difference solver for wave equation modeling was used. Seismic data were recorded at 50 receivers spaced at 32.65 m apart at depths of 560 m within the model. The goal was to reconstruct the subsurface Green's function vector that contains the direct arrival from the source to the receivers and the reflected waves from various interfaces in the model. This was done using both traditional seismic interferometry by cross-correlation as well as the focused blind deconvolution methods disclosed herein and as implemented in Algorithms I and II above. The focused blind deconvolution methodology resulted in a lower error and clearly depicted the direct and scattered arrivals, confirming that the method is capable of handling the complexities present in the subsurface model.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Processor-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Accordingly, while the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. A method of controlling a system, the method comprising:
   determining a cross-correlation of a first signal detected at a first position and a second signal detected at a second position spaced from the first position;
   obtaining a cross-correlation of a first response function and a second response function based on the cross-correlation of the first and second signals and subject to a first constraint that the first and second response functions are maximally white;
   obtaining the first and second response functions based on the cross-correlation of the first and second response functions and subject to a second constraint that the first and second response functions are maximally front-loaded; and
   controlling a function of the system based on the first and second response functions.

2. The method of claim 1, further comprising obtaining an amplitude spectrum of the first and second response functions, at least in part, by obtaining the cross-correlations of the first and second response functions subject to the first constraint.

3. The method of claim 2, further comprising obtaining a phase spectrum of the first and second response functions, at least in part, by obtaining the first and second response functions subject to the second constraint.

4. The method of claim 1, wherein the first signal is a convolution of a source signal and the first response function, and the second signal is a convolution of the source signal and the second response function.

5. The method of claim 4, further comprising generating the source signal with a source spaced from a plurality of sensors configured to detect the plurality of signals.

6. The method of claim 5, wherein a spacing between the plurality of sensors is greater than a wavelength of the source signal.

7. The method of claim 1, wherein the first and second response functions are impulse response functions of a medium.

8. The method of claim 1, wherein controlling the system based on the first and second response functions comprises determining at least one property of a medium based on the first and second response functions.

9. The method of claim 1, further comprising outputting an image of the first and second response functions on a display.

10. The method of claim 1, further comprising storing the first and second response functions in a non-transitory computer readable storage medium.

11. The method of claim 1, wherein the first and second signals comprise at least one selected from the group of acoustic signals, elastic signals, electromagnetic signals, and image data.

12. The method of claim 1, wherein the first and second signals comprise noise signals generated by a tool of the system.

13. The method of claim 1, wherein the system is a drilling system, and wherein controlling the function of the system includes controlling a tool of the drilling system based on the first and second response functions.

* * * * *